US012596214B2

(12) United States Patent
Hwang et al.

(10) Patent No.: US 12,596,214 B2
(45) Date of Patent: Apr. 7, 2026

(54) POLARIZING PLATE AND OPTICAL DISPLAY APPARATUS COMPRISING THE SAME

(71) Applicant: SAMSUNG SDI CO., LTD., Yongin-si (KR)

(72) Inventors: Seon Oh Hwang, Suwon-si (KR); Jung Hun You, Suwon-si (KR); Kwang Ho Shin, Suwon-si (KR); Sang Hum Lee, Suwon-si (KR)

(73) Assignee: Wuxi Hengxin Optoelectronic Materials Co., Ltd., Wuxi (CN)

( * ) Notice: Subject to any disclaimer, the term of this patent is extended or adjusted under 35 U.S.C. 154(b) by 649 days.

(21) Appl. No.: 17/930,384

(22) Filed: Sep. 7, 2022

(65) Prior Publication Data

US 2023/0072697 A1 Mar. 9, 2023

(30) Foreign Application Priority Data

Sep. 9, 2021 (KR) ........................ 10-2021-0120459

(51) Int. Cl.
*G02B 5/30* (2006.01)

(52) U.S. Cl.
CPC .................................. *G02B 5/3025* (2013.01)

(58) Field of Classification Search
CPC .... G02B 5/3025; G02B 5/3033; G02B 5/305;
G02B 5/3083; G02B 27/28; G02B
27/286; G02B 1/14; G02F 1/133528;
G02F 1/133538; C09K 2323/031
See application file for complete search history.

(56) References Cited

U.S. PATENT DOCUMENTS

| | | | |
|---|---|---|---|
| 2015/0153495 A1* | 6/2015 | Matsuda ................... | B05D 5/06 |
| | | | 427/163.1 |
| 2020/0409213 A1* | 12/2020 | Takeda ................ | G02F 1/13338 |

FOREIGN PATENT DOCUMENTS

KR 10-2018-0081197 A 7/2018

OTHER PUBLICATIONS

English language translation of Chinese Patent Application No. CN110727142. Downloaded from Espacenet at https://worldwide. espacenet.com/ on Dec. 29, 2025. Translation provided by Google Translate tool on site. (Year: 2020).*

* cited by examiner

*Primary Examiner* — Angela M. Medich
(74) *Attorney, Agent, or Firm* — Ricky Lam

(57) ABSTRACT

A polarizing plate and an optical display apparatus including the same are provided. A polarizing plate includes: a polarizer; and a protective layer on at least one surface of the polarizer, and the polarizing plate includes a first region and a second region having a lower light transmittance than the first region and has a moisture content of 2.0 g/m² or less.

9 Claims, 5 Drawing Sheets

RELATED ART

POLARIZING PLATE AND OPTICAL DISPLAY APPARATUS COMPRISING THE SAME

CROSS-REFERENCE TO RELATED APPLICATION

This application claims priority to and the benefit of Korean Patent Application No. 10-2021-0120459, filed on Sep. 9, 2021 in the Korean Intellectual Property Office, the entire disclosure of which is incorporated herein by reference.

BACKGROUND

1. Field

Aspects of embodiments of the present invention relate to a polarizing plate and an optical display apparatus including the same.

2. Description of the Related Art

A polarizing plate is provided to an optical display apparatus to display an image or to improve image quality. In a mobile display, such as a mobile phone and the like, the polarizing plate may be used as an intermediate path for an image sensor, such as a camera and the like, to take a picture or capture an image.

Referring to FIG. 3A, an optical display apparatus includes a display panel 50, which includes a base layer 51 and a plurality of light emitting diodes 52, a polarizing plate 40 formed on the display panel 50, a cover glass 60 formed on the polarizing plate 40, and an image sensor 10 disposed to pass through a portion of the display panel 50. The image sensor 10 is disposed inside the polarizing plate 40 to pass through a portion of the polarizing plate 40. A region 40a of the polarizing plate 40 corresponding to the image sensor is a non-image display region. In order to secure a space receiving the image sensor 10 therein, the polarizing plate 40 is machined by a physical punching method. In this case, however, an image display region 40b can provide a poor image due to cracks in a region around a punched region for the region 40a of the polarizing plate 40.

Referring to FIG. 3B, an optical display apparatus may include a polarizing plate 70, which is formed with a region 70a for operating the image sensor 10 and an image display region 70b by a chemical or optical method, instead of physical punching of the polarizing plate 40 as shown in FIG. 3A. In this case, the region 70a corresponds to a non-image display region. In addition, the display panel 50 including the light emitting diodes 52 is divided by the image sensor 10, thereby making it difficult to perform machining and the like.

In recent years, an optical display apparatus including an image sensor disposed at a lower portion thereof is developed in the art, instead of defining a region for the image sensor penetrating a portion of the display panel including the light emitting diodes to secure a space for the image sensor, as shown in FIG. 3A and FIG. 3B. In this case, a region of the polarizing plate corresponding to the image sensor is also required to perform an image display function and to prevent visual observation of the image sensor at the outside in the course of performing the image display function while providing a clear image in the course of photographing. However, there is a limit to use of a typical polarizing plate in the above optical display apparatus.

On the other hand, a polarizing plate is bonded to a cover glass or the like through a pressure sensitive adhesive (PSA) or an optically clear adhesive (OCA) in the optical display apparatus instead of being simply stacked therein. However, when left at high temperature for a long period of time, the polarizing plate can suffer from deterioration in reliability, whereby the region of the polarizing plate corresponding to the image sensor cannot provide a clear image in the course of photographing.

The background technique of the present invention is disclosed in Korean Patent Laid-open Publication No. 10-2018-0081197.

SUMMARY

According to an aspect of embodiments of the present invention, a polarizing plate is provided that includes a first region capable of realizing an image display function and an external image-photographing function by an image sensor.

According to another aspect of embodiments of the present invention, a polarizing plate is provided that includes a first region and a second region having different light transmittances, in which the first region secures good reliability even after the polarizing plate is left at high temperature for a long period of time, with a cover glass stacked on each of upper and lower surfaces of the polarizing plate.

It is a further aspect of the present invention to provide an optical display apparatus including the polarizing plate according to the present invention.

An aspect of one or more embodiments of the present invention relates to a polarizing plate.

According to one or more embodiments of the present invention, a polarizing plate includes: a polarizer; and a protective layer formed on at least one surface of the polarizer, wherein the polarizing plate includes a first region and a second region having a lower light transmittance than the first region and has a moisture content of $2.0 \, \text{g/m}^2$ or less.

In one or more embodiments, each of the first region and the second region may have a moisture content of $2.0 \, \text{g/m}^2$ or less.

In one or more embodiments, the first region may have a light transmittance of 50% to 80%, and the second region may have a light transmittance of 40% to less than 50%.

In one or more embodiments, the first region may have a lower degree of polarization than the second region and may have a degree of polarization of 25% to 80%.

Another aspect of one or more embodiments of the present invention relates to an optical display apparatus. The optical display apparatus includes the polarizing plate according to an embodiment of the present invention.

Embodiments of the present invention provide a polarizing plate that includes a first region capable of realizing an image display function and an external image-photographing function by an image sensor.

Further, embodiments of the present invention provide a polarizing plate that includes a first region and a second region having different light transmittances, in which the first region secures good reliability even after the polarizing plate is left at high temperature for a long period of time, with a cover glass stacked on each of upper and lower surfaces of the polarizing plate.

Further, embodiments of the present invention provide an optical display apparatus including the polarizing plate according to an embodiment of the present invention.

DETAILED DESCRIPTION

Figure 1A:
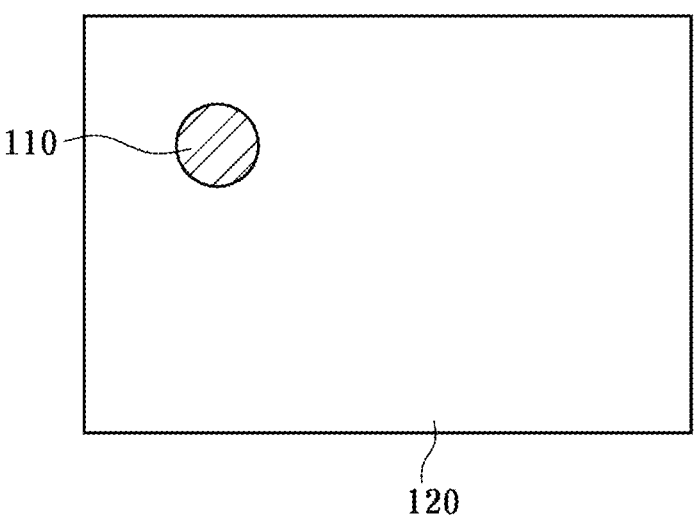
FIG. 1A is a plan view of a polarizing plate according to an embodiment of the present invention and FIG. 1B is a cross-sectional view of a polarizing plate according to an embodiment of the present invention.

Herein, some embodiments of the present invention will be described in further detail with reference to the accompanying drawings such that the present invention can be easily implemented by those skilled in the art. However, it is to be understood that the present invention may be embodied in different ways and is not limited to the following embodiments.

In the drawings, components unrelated to description may be omitted for clear description of the invention, and like components will be denoted by like reference numerals throughout the specification. Although lengths, thicknesses, or widths of various components may be exaggerated for understanding in the drawings, the present invention is not limited thereto.

Herein, spatially relative terms, such as "upper" and "lower," are defined with reference to the accompanying drawings. Thus, it is to be understood that the term "upper surface" can be used interchangeably with the term "lower surface," for example.

Herein, "light transmittance" and "degree of polarization" of a polarizing plate are values measured at a wavelength of 380 nm to 780 nm, for example, at a wavelength of 550 nm. "Light transmittance" means total transmittance rather than orthogonal light transmittance.

Herein, with regard to "light transmittance of the first region," the first region has the same light transmittance in an overall region thereof even at the same wavelength. However, when the light transmittance is not the same in the overall region of the first region at the same wavelength, the light transmittance of the first region means average transmittance thereof.

Herein, with regard to "light transmittance of the second region," the second region has the same light transmittance in an overall region thereof even at the same wavelength. However, when the light transmittance is not the same in the overall region of the second region at the same wavelength, the light transmittance of the second region means average transmittance thereof.

Herein, "average transmittance" means an average value of light transmittances in a wavelength range in which the average transmittance is to be measured. For example, the average transmittance may be obtained from an average value of light transmittances at a plurality of points arbitrarily designated in a region where the average transmittance is to be measured.

Herein, "moisture content" may be measured by the following method.

A polarizing plate is cut into a sample having a size of 100 mm×150 mm, followed by measuring an initial weight W1 of the sample. The sample is dried at 105° C. for 2 hours. Thereafter, the weight W2 of the sample is measured. The moisture content of the polarizing plate (M, unit: $g/m^2$) is calculated according to the following Equation 2.

$$M=|W1-W2|/(0.1\times0.15), \tag{2}$$

The moisture content of each of the first region and the second region may be calculated substantially by the same method as in Equation 2, which is used to calculate the moisture content of the polarizing plate. Here, the size of each of the first region and the second region may be suitably adjusted.

As used herein to represent a specific numerical range, "X to Y" means "greater than or equal to X and less than or equal to Y (X≤ and ≤Y)."

Embodiments of the present invention relate to a polarizing plate including a first region and a second region having a lower light transmittance than the first region. In particular, the first region serves to realize not only an image display function but also an external image-photographing function, as described below.

Embodiments of the present invention provide a polarizing plate including a first region and a second region, in which the first region secures good reliability at high temperature, with a cover glass stacked on each of upper and lower surfaces of the polarizing plate. Reliability at high temperature is measured on a specimen of the polarizing plate, in which the cover glass is stacked on each of the upper and lower surfaces thereof. With the cover glass stacked on each of the upper and lower surfaces of the polarizing plate, reliability of the first region at high temperature is measured under severer conditions than that of the first region with the cover glass not stacked on each of the upper and lower surfaces thereof. This is because the polarizing plate may prevent (e.g., completely prevent) moisture escaping therefrom by securing the cover glass to each of the upper and lower surfaces of the polarizing plate via a pressure sensitive adhesive (PSA) or an optically clear adhesive (OCA).

In an embodiment, the polarizing plate according to the present invention may have a transmittance variation rate of 5% or less, for example, 0% to 5%, as calculated according to the following Equation 1. Within this range, the first region has a low transmittance variation rate, whereby an optical display apparatus including the polarizing plate allows the first region to realize a target function, particularly an external image-photographing function, even after the optical display apparatus is left at high temperature for a long period of time.

$$\text{Transmittance variation rate} = |T2-T1|, \tag{1}$$

where T1 is the light transmittance of the first region (before the first region is left at 85° C. for 500 hours) (unit: %), and T2 is the light transmittance of the first region after the first region is left at 85° C. for 500 hours (unit: %).

The polarizing plate according to one or more embodiments of the present invention includes: a polarizer; and a protective layer formed on at least one surface of the polarizer, wherein the polarizing plate includes a first region and a second region having a lower light transmittance than the first region and has a moisture content of 2.0 g/m² or less.

Figure 1B:
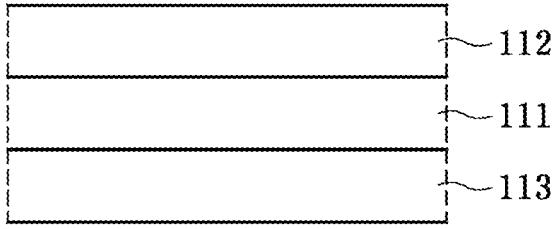

Next, a polarizing plate according to an embodiment of the present invention will be described with reference to FIG. 1A and FIG. 1B. FIG. 1A is a plan view of a polarizing plate according to an embodiment of the present invention and FIG. 1B is a cross-sectional view of a polarizing plate according to an embodiment of the present invention.

In an embodiment, a polarizing plate includes a first region 110 and a second region 120 in an image display region. The "image display region" means a region in which an image is displayed on an optical display apparatus including the polarizing plate. In the polarizing plate, the image display region may occupy an area ratio of 90% to 100%, and, in an embodiment, 100%. In an embodiment, the polarizing plate may not include a non-image display region.

In an embodiment, the first region 110 is not formed by physical punching, and the first region 110 does not have a punching hole shape and is integrally formed with the second region 120.

In an embodiment, the first region 110 has a higher light transmittance than the second region 120. Accordingly, the first region may perform an external image-photographing function through an image sensor, such as a camera and the like, unlike the second region, while performing an image display function as in the second region.

In an embodiment, the first region 110 has a light transmittance of 50% to 80%. Within this range, the first region can perform the image display function through suppression of visual observation of the image sensor at the outside in non-use of the image sensor while increasing resolution of an image in use of the image sensor. In an embodiment, the first region may have a light transmittance of 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, or 80%, and, in an embodiment, 60% to 80%.

In particular, the first region according to embodiments of the present invention can realize all of the aforementioned effects in a laminate of the image sensor, a light emitting diode-containing display panel, and the polarizing plate in the optical display apparatus. The light emitting diode-containing display panel and the image sensor are sequentially disposed under the first region, whereby the first region can perform both the image display function and the external image-photographing function at the same time. An optical display apparatus according to an embodiment of the invention will be described below in further detail.

The second region 120 performs only an image display function, which is independent of the image display function realized by the image sensor in the optical display apparatus. In an embodiment, the second region may have a light transmittance of 40% to less than 50%, and, in an embodiment, 40% or more, or greater than 40%, 41%, 42%, 43%, 44%, 45%, 46%, 47%, 48%, 49%, or less than 50%, and, in an embodiment, 40% to 45%. Within this range, the second region can efficiently realize the image display function.

Although the first region 110 and the second region 120 may have a same degree of polarization, in an embodiment, the first region has a lower degree of polarization than the second region in consideration of a process of forming the first region described below.

In an embodiment, the first region may have a degree of polarization of 25% to 80%, and, in an embodiment, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, or 80%, and, in an embodiment, 28% to 70%. Within this range, the first region does not obstruct recognition of an object by the camera. In an embodiment, the second region may have a degree of polarization of 90% or more, and, in an embodiment, 90%, 91%, 92%, 93%, 94%, 95%, 96%, 97%, 98%, 99%, or 100%, and, in an embodiment, 90% to 100%. Within this range, the second region can provide an antireflection effect with respect to external light.

For the first region, the light transmittance of 50% to 80% and the degree of polarization of 25% to 80% can be realized by irradiation of the first region with pulsed light described below.

In an embodiment, the first region 110 may occupy an area ratio of 10% or less in the polarizing plate, and, in an embodiment, in the entirety of the first region 110 and the second region 120. Within this range, the first region can provide an image sensor function. The first region 110 may have a circular, elliptical, angled, or amorphous shape, without being limited thereto. In the polarizing plate, the first region 110 may be placed at any location without limitation and may be placed corresponding to a location of the image sensor in an optical display apparatus.

In an embodiment, the polarizing plate has a moisture content of 2.0 g/m² or less. Within this range, the polarizing plate can achieve improvement in reliability at high temperature, as measured on a specimen of the polarizing plate having a cover glass stacked on each of upper and lower surfaces thereof via a PSA or an OCA. In an embodiment, the polarizing plate may have a moisture content of 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 g/m², and, in an embodiment, 1.0 g/m² to 2.0 g/m², and, in an embodiment, 1.2 g/m² to 2.0 g/m².

When the polarizing plate not formed with the first region is referred to as a laminate, the above moisture content of the polarizing plate can be realized by adjusting drying conditions (e.g., time, temperature) in fabrication of the laminate or by dehumidifying the laminate before formation of the first region. This will be described in further detail below.

In an embodiment, each of the first region and the second region may have a moisture content of 2.0 g/m² or less, and, in an embodiment, 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 g/m², and, in an embodiment, 1.0 g/m² to 2.0 g/m², and, in an embodiment, 1.2 g/m² to 2.0 g/m².

The first region and the second region may have the same moisture content or different moisture contents.

The polarizing plate includes a polarizer and a protective film formed on at least one surface of the polarizer.

In an embodiments, the polarizing plate includes a polarizer and protective films respectively formed on opposite surfaces of the polarizer. In other embodiments, the polarizing plate may include a polarizer and a protective film formed only on one surface of the polarizer. In some embodiments, a polarizing plate includes a polarizer 111 and protective films 112, 113 respectively formed on opposite surface of the polarizer 111.

In an embodiment, the protective film may be a typical protective film used as a protective film for polarizers. By way of example, the protective film may include a protective film formed of at least one resin selected from among cellulose resins, such as triacetylcellulose (TAC) and the like, polyester resins, such as polyethylene terephthalate (PET), polybutylene terephthalate, polyethylene naphthalate, polybutylene naphthalate, and the like, cyclic olefin polymer (COP) resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins. In an embodiment, the protective film may have a thickness of 10 μm to 100 μm, for example, 10 μm to 60 μm. Lamination may be performed using a bonding agent by a typical method known to those skilled in the art.

In an embodiment, the protective film may include a retardation layer exhibiting phase retardation. In an embodiment, the retardation layer may be a single-sheet type retardation layer or a single-sheet type retardation film. In another embodiment, the retardation layer may be a double-sheet type retardation layer or a double-sheet type retardation film. The retardation layer may be formed of the resin or liquid crystals described above.

Next, a method of manufacturing the polarizing plate including the first region and the second region will be described.

The polarizing plate according to one or more embodiments of the present invention may be manufactured by a method that includes: a first step of preparing a laminate including a polarizer (not formed with a first region and a second region) and a protective film formed on at least one surface of the polarizer (not formed with the first region and the second region); a second step of performing dehumidification of the laminate; and a third step of forming the first region through irradiation of a region (e.g., a predetermined region) of the laminate with pulsed light having a wavelength of 200 nm to 800 nm. A region of the laminate not irradiated with the pulsed light becomes the second region.

First Step

The polarizer (not formed with the first region and the second region) includes a polyvinyl alcohol film dyed with iodine and/or dichroic dyes and stretched. In an embodiment, the polarizer (not formed with the first region and the second region) may have a thickness of 3 μm to 50 μm, and, in an embodiment, 3 μm to 30 μm. Within this range, the polarizer can be used in the polarizing plate.

The polarizer (not formed with the first region and the second region) may be manufactured by a method described herein.

First, the dyed and stretched polyvinyl alcohol film is manufactured.

The dyed and stretched polyvinyl alcohol film may be manufactured through dyeing, stretching, cross-linking, and color correction processes. In the method of manufacturing the polarizer according to one or more embodiments of the present invention, dyeing and stretching may be performed in any sequence. That is, the polyvinyl alcohol film may be dyed and then stretched or vice versa, or may be concurrently (e.g., simultaneously) subjected to dyeing and stretching.

The polyvinyl alcohol film may be a typical polyvinyl alcohol film used in manufacture of a typical polarizer. The polyvinyl alcohol film may be a film produced from polyvinyl alcohol or derivatives thereof. In an embodiment, the polyvinyl alcohol film may have a degree of polymerization of 1,000 to 5,000, a degree of saponification of 80 mol % to 100 mol %, and a thickness of 1 μm to 30 μm, and, in an embodiment, 3 μm to 30 μm. Within this range, the polyvinyl alcohol film can be used in manufacture of a thin polarizer.

The polyvinyl alcohol film may be subjected to washing with water and swelling before dyeing and stretching. The polyvinyl alcohol film may be subjected to washing with water to remove foreign matter from the surface of the polyvinyl alcohol film. The polyvinyl alcohol film may be subjected to swelling to allow more efficient dyeing or stretching of the polyvinyl alcohol film. Swelling may be realized by leaving the polyvinyl alcohol film in an aqueous solution of a swelling bath, as well-known to those skilled in the art. The temperature of the swelling bath and swelling time are not particularly limited. The swelling bath may further include boric acid, an inorganic acid, a surfactant, and the like, and the content of these components may be adjusted.

The polyvinyl alcohol film may be dyed by dipping the polyvinyl alcohol film in a dyeing bath containing iodine and/or dichroic dyes. In the dying process, the polyvinyl alcohol film is dipped in a dyeing solution, which may be an aqueous solution containing iodine and/or dichroic dyes. In an embodiment, iodine is provided in the form of an iodine-based dye. The iodine-based dye may include at least one selected from among potassium iodide, hydrogen iodide, lithium iodide, sodium iodide, zinc iodide, lithium iodide, aluminum iodide, lead iodide, and copper iodide. In an embodiment, the dying solution may be an aqueous solution containing 1 wt % to 5 wt % of iodine and/or dichroic dyes. Within this range, the polarizer has a degree of polarization within a range (e.g., a predetermined range) to be used in a display apparatus.

In an embodiment, the dyeing bath may have a temperature of 20° C. to 45° C. and the polyvinyl alcohol film may be dipped in the dyeing bath for 10 seconds to 300 seconds. Within this range, it is possible to realize a polarizer having a high degree of polarization.

The dyed polyvinyl alcohol film may be stretched in a stretching bath to exhibit polarization through alignment of iodine and/or dichroic dyes. In an embodiment, stretching may be realized by dry stretching and wet stretching. Dry stretching may be performed by inter-roll stretching, compression stretching, hot-roll stretching, and the like, and wet stretching may be performed in a wet stretching bath containing water at 35° C. to 65° C. The wet stretching bath may further contain boric acid to improve the stretching effect.

The polyvinyl alcohol film may be stretched at a certain stretching ratio, and, in an embodiment, a total stretching ratio of 5 times to 7 times, and, in an embodiment, 5.5 times to 6.5 times. Within this range, the polyvinyl alcohol film can prevent or substantially prevent cutting, wrinkling, and the like upon stretching, and can realize a polarizer achieving improvement in polarization degree and transmittance. Stretching may be uniaxial stretching and may be realized through single-stage stretching or multi-stage stretching, such as bi-stage stretching and tri-stage stretching, to prevent or substantially prevent fracture of the polyvinyl alcohol film in manufacture of a thin polarizer.

Although dyeing and stretching of the polyvinyl alcohol film are performed in the stated sequence in the above embodiment, dyeing and stretching may be performed in the same reaction bath.

Before or after the dyed polyvinyl alcohol film is stretched, the polyvinyl alcohol film may be subjected to crosslinking in a crosslinking bath. Crosslinking is a process that allows the polyvinyl alcohol film to be more strongly dyed with iodine and/or dichroic dyes, and may be performed using boric acid as a crosslinking agent. In order to enhance the crosslinking effect, the crosslinking bath may further contain a phosphoric acid compound, potassium iodide, or the like.

The dyed and stretched polyvinyl alcohol film may be subjected to color correction in a color correction bath. In color correction, the dyed and stretched polyvinyl alcohol film is dipped in the color correction bath filled with a color correction solution containing potassium iodide. As a result, the polarizer has reduced color values and iodine cations ($I^-$) are removed from the polarizer, thereby improving durability. In an embodiment, the color correction bath may have a temperature of 20° C. to 45° C. and the polyvinyl alcohol film may be dipped therein for 10 seconds to 300 seconds.

Next, the laminate is prepared by forming a protective layer on at least one surface of the dyed and stretched polyvinyl alcohol film. The protective layer may be manufactured by a typical method known to those skilled in the art.

The protective layer is formed on at least one surface of the polarizer and may be a photocurable coating layer or protective film.

Second Step

The laminate may be subjected to dehumidification in a dehumidifying chamber to reach the moisture content in the polarizing plate. In an embodiment, although dehumidification conditions can be changed depending upon the size of the laminate, dehumidification of the laminate may be realized by leaving the laminate at 40° C. to 70° C. for 0.5 hours to 10 hours. Within this range, the polarizing plate can have the moisture content according to the present invention without change in performance of the polarizing plate. In an embodiment, the laminate may be left at 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., or 70° C. for 0.5 hours, 1 hour, 1.5 hours, 2 hours, 2.5 hours, 3 hours, 3.5 hours, 4 hours, 4.5 hours, 5 hours, 5.5 hours, 6 hours, 6.5 hours, 7 hours, 7.5 hours, 8 hours, 8.5 hours, 9 hours, 9.5 hours, or 10 hours.

Third Step

The first region is formed by irradiating a region (e.g., a predetermined region) of the laminate with pulsed light at a wavelength of 200 nm to 800 nm. Irradiation with the pulsed light having a wavelength of 200 nm to 800 nm may be realized by a xenon flash lamp.

Upon formation of a region having a lower degree of polarization through irradiation with light, the xenon flash lamp can reduce damage to a depolarization region of the polyvinyl alcohol film dyed with iodine and/or dichroic dye by emitting light in the form of pulses at a continuous wavelength of 200 nm to 800 nm, as compared to typical femtosecond or picosecond laser beams. Here, even after irradiation with pulsed light in the wavelength range of 200 nm to 800 nm, a region of the polarizer corresponding to the first region may contain dichroic substances, such as iodine, dichroic dyes, and the like.

Upon irradiation with pulsed light, the xenon flash lamp may emit the pulsed light once to 10 times, and, in an embodiment, 1, 2, 3, 4, 5, 6, 7, 8, 9, or 10 times at a voltage of 300 V to 500 V, and, in an embodiment, 300 V, 310 V, 320 V, 330 V, 340 V, 350 V, 360 V, 370 V, 380 V, 390 V, 400 V, 410 V, 420 V, 430 V, 440 V, 450 V, 460 V, 470 V, 480 V, 490 V, or 500 V, at an energy density of 3.0 $J/cm^2$ to 6.0 $J/cm^2$, and, in an embodiment, 3.0. 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, or 6.0 $J/cm^2$, and at a pulse frequency of 0.5 Hz to 2 Hz, and, in an embodiment, 0.5 Hz, 1 Hz, 1.5 Hz, or 2 Hz for an irradiation time of 5 ms (milliseconds) to 15 ms, and, in an embodiment, 5 ms, 6 ms, 7 ms, 8 ms, 9 ms, 10 ms, 11 ms, 12 ms, 13 ms, 14 ms, or 15 ms. Within these ranges, it is possible to assist in achievement of light transmittance and polarization degree of the first region according to the present invention. Upon irradiation with the light under the above conditions, a mask having a shape (e.g., a predetermined shape) is brought into close contact with the dyed and stretched polyvinyl alcohol film to allow a region not requiring depolarization to maintain the corresponding light transmittance thereof.

In an embodiment, the polarizer formed with the first region and the second region may have a thickness of 3 μm to 50 μm, and, in an embodiment, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, 41 μm, 42 μm, 43 μm, 44 μm, 45 μm, 46 μm, 47 μm, 48 μm, 49 μm, or 50 μm, and, in an embodiment, 3 μm to 30 μm. Within this range, the polarizer can be used in the polarizing plate.

Next, a method of manufacturing the polarizing plate including the first region 110 and the second region 120 according to another embodiment of the invention will be described.

The polarizing plate according to an embodiment of the present invention may be manufactured by irradiating a region (e.g., a predetermined region) of a polarizer (not formed with a first region and a second region) with pulsed light at a wavelength of 200 nm to 800 nm to form the first region and forming a protective layer on at least one surface of the polarizer, followed by dehumidification. The region (e.g., the predetermined region) of the polarizer irradiated with the pulsed light becomes the first region and a region of the polarizer not irradiated with the pulsed light becomes the second region. The method according to this embodiment is substantially the same as the method according to the above-described embodiment except that the polarizer (not formed with the first region and the second region) is irradiated with the pulsed light instead of irradiating the laminate of the polarizer and the protective layer therewith.

Next, an optical display apparatus according to an embodiment of the present invention will be described.

Figure 2A:
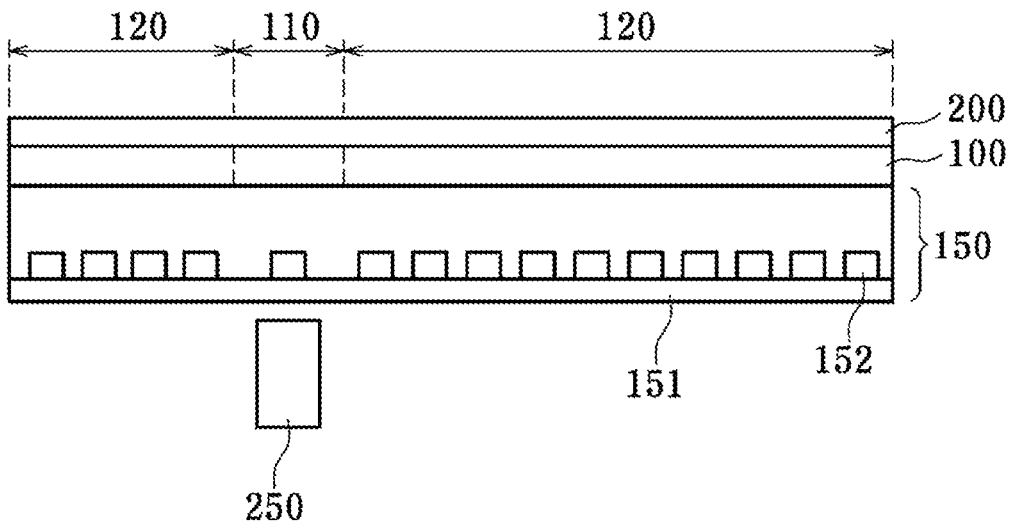
FIG. 2A is a cross-sectional view of an optical display apparatus including a polarizing plate according to an embodiment of the present invention and FIG. 2B is a cross-sectional view of an optical display apparatus including a polarizing plate according to an another embodiment of the present invention.
Figure 2B:
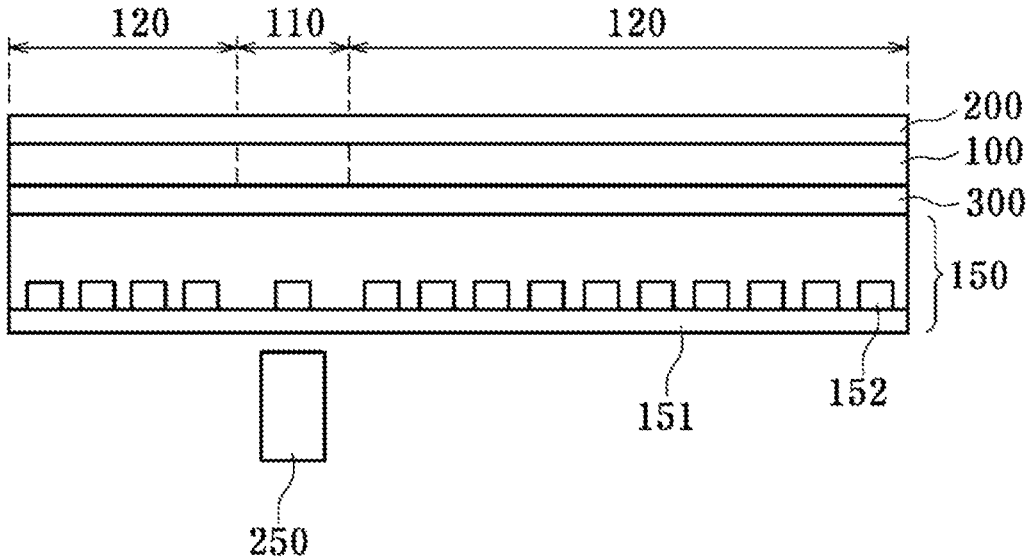
Figure 3A:
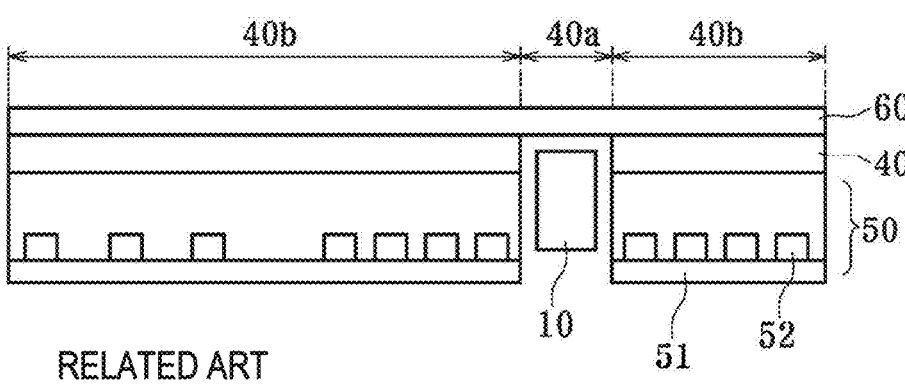
FIGS. 3A and 3B are cross-sectional views of an optical display apparatus including a typical image sensor.
Figure 3B:
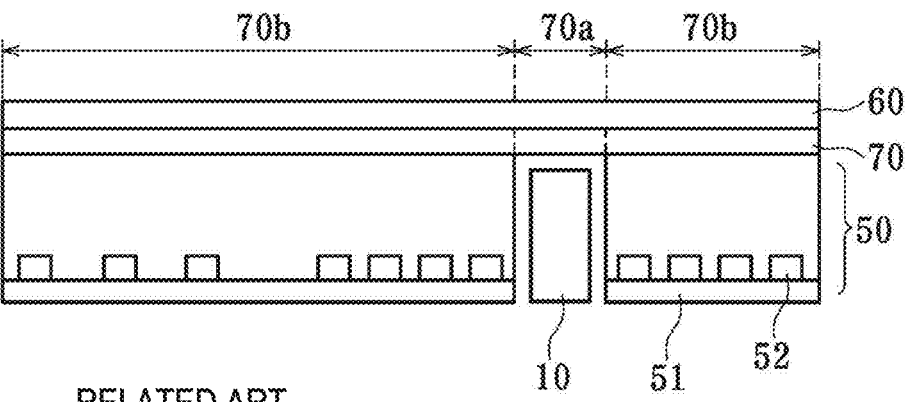

The optical display apparatus according to an embodiment of the present invention includes the polarizing plate according to an embodiment of the present invention. The optical display apparatus may include a liquid crystal display, a light emitting diode display including organic light emitting diodes, and the like. An optical display apparatus according to an embodiment of the present invention will be described in further detail with reference to FIG. 2A and FIG. 2B.

The optical display apparatus according to an embodiment includes a display panel 150, which includes a base layer 151 and light emitting diodes 152, a polarizing plate 100 formed on the display panel 150, a upper cover glass 200 formed on the polarizing plate 100, and an image sensor 250 disposed under the display panel 150. The optical display apparatus according to an embodiment includes a display panel 150, which includes a base layer 151 and light emitting diodes 152, a polarizing plate 100 formed on the display panel 150, a upper cover glass 200 formed on the polarizing plate 100, a lower cover glass 300 formed on the polarizing plate 100, and an image sensor 250 disposed under the display panel 150.

The polarizing plate 100 includes the first region 110 and the second region 120. The polarizing plate includes the polarizing plate according to the present invention. Both the first region 110 and the second region 120 constitute image display regions of the optical display apparatus.

In an embodiment, the light emitting diodes 152 are less densely disposed in the first region 110 than in the second region 120. With this structure, the first region can realize an image display function through the image sensor 250 while realizing an image display function through the display panel 150.

The image sensor 250 is disposed under the first region 110. The image sensor 250 may include a camera, without being limited thereto.

Next, the present invention will be described in further detail with reference to some examples. However, it should be noted that these examples are provided for illustration and are not to be construed in any way as limiting the present invention.

Components Used in Examples and Comparative Examples (1) Material of polarizer: Polyvinyl alcohol film (VF-PE3000, thickness: 30 μm, Kuraray Co., Ltd., Japan)

(2) Upper protective film: Triacetylcellulose film having a hard coating layer on an upper surface thereof (KC4UYW, thickness: 40 μm, Konica Co., Ltd., Japan)

(3) Lower protective film: Cyclic olefin polymer film (ZA12, Zeon Co., Ltd., Japan)

Example 1

A polyvinyl alcohol film washed with water was subjected to swelling treatment in a swelling bath filled with water at 30° C.

After swelling treatment, the polyvinyl alcohol film was dyed with an aqueous solution containing 3 wt % of potassium iodide in a dyeing bath at 30° C. for 150 seconds to 200 seconds. The dyed polyvinyl alcohol film was passed through a wet crosslinking bath filled with an aqueous solution containing 3 wt % of boric acid at 30° C. to 40° C. Thereafter, the polyvinyl alcohol film was stretched in an aqueous solution containing 3 wt % of boric acid at 50° C. to 60° C. to reach a total stretching ratio of 6 times an initial length thereof, thereby producing a polarizer. A laminate was prepared by bonding the upper and lower protective films to upper and lower surfaces of the prepared polarizer using a bonding agent (Z-200, Nippon Goshei Co., Ltd.), respectively.

The laminate was left in a dehumidification chamber at 50° C. for 5 hours to perform dehumidification of the laminate.

The laminate was cut to a predetermined size, and a target region of the laminate was irradiated with pulsed light at a wavelength of 200 nm to 800 nm using a xenon flash lamp under the conditions set forth in Table 1, thereby fabricating a polarizing plate formed with a first region. A region of the polarizing plate not irradiated with the pulsed light became a second region.

Example 2

A polarizing plate having a first region and a second region was manufactured in the same manner as in Example 1 except that the dehumidification conditions were changed.

Comparative Example 1

A polarizing plate having a first region and a second region was manufactured in the same manner as in Example 1 except that a laminate was formed by bonding protective films to both surfaces of a polarizer, and a predetermined region of the laminate was irradiated with femtosecond laser beams at a wavelength of 515 nm to form the first region.

Comparative Example 2

A polarizing plate having a first region and a second region was manufactured in the same manner as in Example 1 except that dehumidification was not performed.

Comparative Example 3

A polarizing plate having a first region and a second region was manufactured in the same manner as in Example 1 except that the dehumidification conditions were changed by leaving the laminate at 30° C. for 0.5 hours to 10 hours.

Figure 6A:
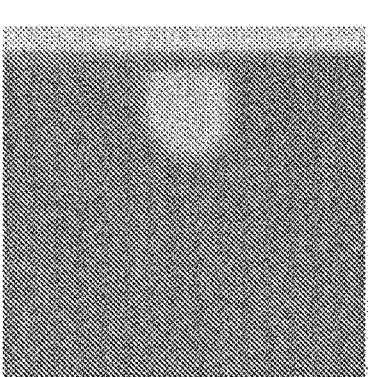
FIGS. 6A and 6B are camera images of a first region of a polarizing plate of a Comparative Example 3 before and after being left at 85° C. for 500 hours, respectively.
Figure 6B:
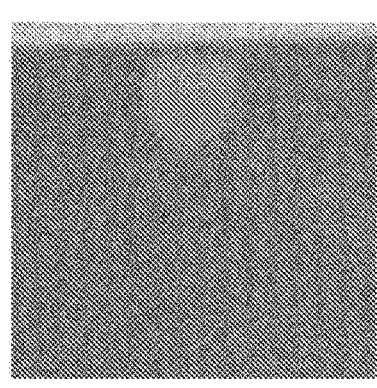
Figure 7:
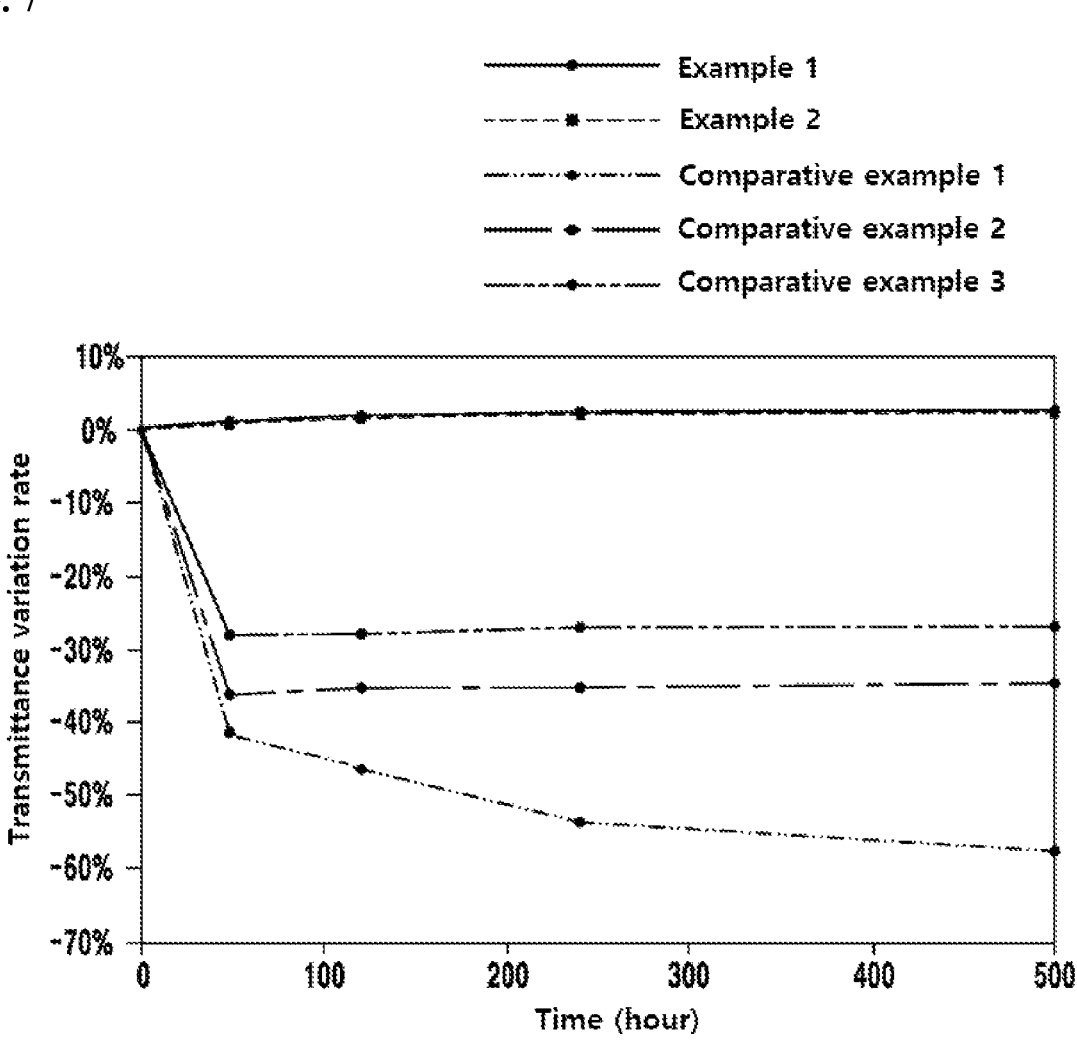
FIG. 7 is a graph depicting light transmittance of a first region of each of polarizing plates depending on time upon evaluation of reliability at high temperature after preparation of the polarizing plates in the Examples 1 and 2 and Comparative Examples 1 to 3.

The polarizing plates manufactured in the Examples and Comparative Examples were evaluated as to the following properties, and evaluation results are shown in Table 1 and FIG. 7. In addition, FIG. 4A to FIG. 6B show pictures of the first region of each of the polarizing plate before and after evaluation of reliability of the first region.

(1) Moisture content of polarizing plate (unit: g/m$^2$): each of the polarizing plates of the Examples and Comparative Examples was cut into a sample having a size of 100 mm×150 mm, followed by measuring an initial weight W1 of the sample, which in turn was dried at 105° C. for 2 hours. Thereafter, the weight W2 of the sample was measured, followed by calculating the moisture content (M, unit: g/m$^2$)) of the polarizing plate according to Equation 2:

$$M = |W1 - W2|/(0.1 \times 0.15), \qquad (2)$$

(2) Light transmittance of first region and second region (unit: %): light transmittance was measured at a wavelength of 550 nm on each of the first region and the second region of each of the polarizing plates manufactured in the Examples and Comparative Examples using a JASCO V730.

(3) Reliability of first region (unit: %): each of the polarizing plates manufactured in the Examples and Comparative Examples polarizer was cut to a rectangular sample including the first region and having a size of 100 mm×150 mm (MD×TD of polarizer). A specimen was prepared by sequentially stacking an OCA film (thickness: 150 μm, containing (meth)acrylic adhesive resin) and an upper cover glass (thickness: 500 μm) on an upper surface of the polarizing plate and sequentially stacking a PSA film (thickness: 20 μm, containing (meth)acrylic adhesive resin) and a lower cover glass (thickness: 500 μm) on a lower surface of the polarizing plate.

Light transmittance T1 of the first region of the specimen was measured. Thereafter, the specimen was left at 85° C. for 500 hours, followed by measuring light transmittance T2 of the first region. Light transmittance was measured in the same manner as in (2). Reliability of the first region was evaluated based on the light transmittances according to Equation 1. A transmittance variation rate of 5% or less was rated as ○, and a transmittance variation rate of greater than 5% was rated as X.

TABLE 1

| | Example | | Comparative Example | | |
|---|---|---|---|---|---|
| | 1 | 2 | 1 | 2 | 3 |
| Xenon Flash Lamp power (V) | 400 | 400 | — | 400 | 400 |
| Xenon Flash Lamp energy density (J/cm$^2$) | 5.0 | 5.0 | — | 5.0 | 5.0 |
| Femtosecond laser (J/cm$^2$, pulse) | — | — | 0.17 | — | — |
| Moisture content | 1.9 | 1.4 | 3.0 | 3.0 | 2.7 |
| Light transmittance   First region | 70 | 70 | 71 | 70 | 70 |
| Second region | 44 | 44 | 44 | 44 | 44 |
| Reliability | ○ | ○ | X | X | X |

As shown in Table 1, the polarizing plate according to the present invention exhibited high reliability in the first region even after being left at high temperature for a long period of time. Accordingly, although not shown in Table 1, an optical display apparatus including the polarizing plate according to the present invention can realize a desired function through the first region, particularly, an external image-photographing function, even after being left at high temperature for a long period of time. Conversely, the polarizing plates of the Comparative Examples, which did not satisfy the features of the present invention, exhibited lower reliability than the polarizing plates of the Examples.

Figure 4A:
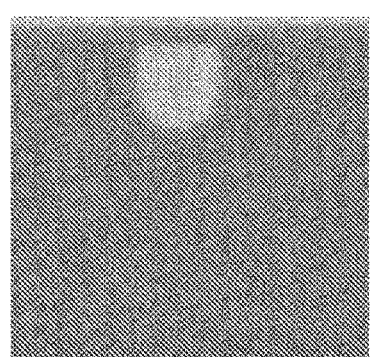
FIGS. 4A and 4B are camera images of a first region of a polarizing plate of an Example 1 of the present invention before and after being left at 85° C. for 500 hours, respectively.
Figure 4B:
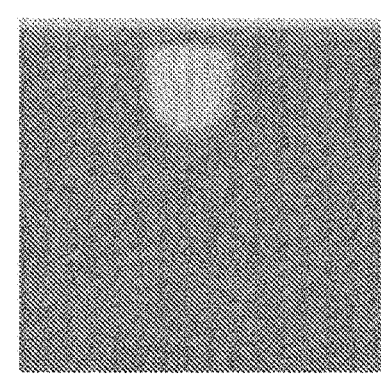
Figure 5A:
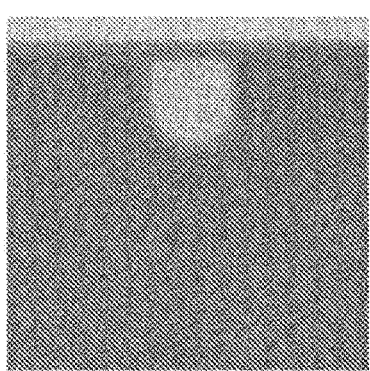
FIGS. 5A and 5B are camera images of a first region of a polarizing plate of an Example 2 of the present invention before and after being left at 85° C. for 500 hours, respectively.
Figure 5B:
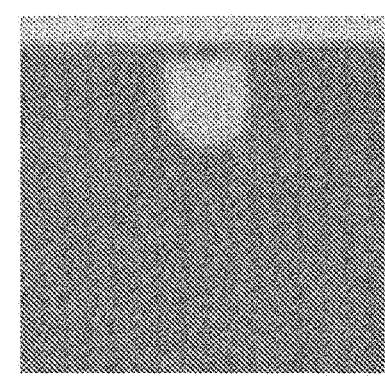

This result can be confirmed through FIG. 4A to FIG. 6B. As shown in FIGS. 4A and 4B and FIGS. 5A and 5B, polarizing plates according to examples of the present invention exhibited no substantial difference in an image of the first region before and after the polarizing plate was left at high temperature for a long period of time. However, as shown in FIGS. 6A and 6B, it could be seen that the color of the first region was the same as shown in FIG. 4A and FIG. 5A before the polarizing plate was left at high temperature for a long period of time, whereas the color of the first region was significantly changed after the polarizing plate was left at high temperature for a long period of time.

Referring to FIG. 7, the polarizing plates according to examples of the present invention exhibited no substantial variation in light transmittance in evaluation of reliability. Conversely, the polarizing plate of Comparative Example 1, in which the first region was formed through irradiation with femtosecond laser beams, suffered from severe variation in light transmittance. Even when the first region was formed through irradiation with femtosecond laser beams, the polarizing plates of Comparative Examples 2 and 3 having a moisture content of greater than 2.0 g/m$^2$ suffered from severe variation in light transmittance.

While some embodiments have been described herein, it is to be understood that various modifications, changes, alterations, and equivalent embodiments may be made by those skilled in the art without departing from the spirit and scope of the invention.

What is claimed is:

1. A polarizing plate comprising: a polarizer; and a protective layer on at least one surface of the polarizer, wherein the polarizing plate comprises a first region and a second region having a lower light transmittance than the first region, and the polarizing plate has a moisture content of 2.0 g/m$^2$ or less, the first region performs an external image-photographing function through an image sensor while performing an image display function as in the second region, and wherein the first region has a degree of polarization of 25% to 80%, and the second region has a degree of polarization of 90% or more.

2. An optical display apparatus comprising the polarizing plate according to claim 1.

3. The polarizing plate according to claim 1, wherein each of the first region and the second region has a moisture content of 2.0 g/m$^2$ or less.

4. An optical display apparatus comprising the polarizing plate according to claim 3.

5. The polarizing plate according to claim 1, wherein the first region has a light transmittance of 50% to 80%, and the second region has a light transmittance of 40% to less than 50%.

6. An optical display apparatus comprising the polarizing plate according to claim 5.

7. The polarizing plate according to claim 1, wherein the first region of the polarizer is formed through femtosecond laser irradiation.

8. The polarizing plate according to claim 1, wherein the thickness of the polarizer in the first region is 3 μm to 30 μm.

9. The polarizing plate according to claim 1, wherein the first region has a circular or polygonal shape.

* * * * *